United States Patent
Kuo et al.

(10) Patent No.: US 12,098,841 B2
(45) Date of Patent: Sep. 24, 2024

(54) OPTICAL COMPONENT, LIGHT SOURCE MODULE AND DISPLAY DEVICE

(71) Applicant: Radiant Opto-Electronics Corporation, Kaohsiung (TW)

(72) Inventors: Yu-Hao Kuo, Kaohsiung (TW); Yi-Shan Lin, Kaohsiung (TW); Ching-Chieh Yeh, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 18/155,716

(22) Filed: Jan. 17, 2023

(65) Prior Publication Data

US 2023/0184409 A1    Jun. 15, 2023

Related U.S. Application Data

(63) Continuation of application No. PCT/CN2021/136626, filed on Dec. 9, 2021.

(51) Int. Cl.
*F21V 9/40* (2018.01)
*G02B 5/18* (2006.01)

(52) U.S. Cl.
CPC .............. *F21V 9/40* (2018.02); *G02B 5/1809* (2013.01); *G02B 5/1871* (2013.01)

(58) Field of Classification Search
CPC ........ F21V 9/40; G02B 5/1809; G02B 5/1871
See application file for complete search history.

(56) References Cited

U.S. PATENT DOCUMENTS

| 4,773,731 | A  | * | 9/1988  | Goldenberg | G03B 21/625 |
|-----------|----|---|---------|------------|-------------|
|           |    |   |         |            | 359/457     |
| 6,172,779 | B1 |   | 1/2001  | Takahashi et al. | |
| 7,245,407 | B2 | * | 7/2007  | Komma | G11B 7/1374 |
|           |    |   |         |       | 365/216     |
| 7,334,933 | B1 | * | 2/2008  | Simon | F21V 7/0091 |
|           |    |   |         |       | 362/328     |
| 7,452,093 | B2 | * | 11/2008 | Nagao | G02B 6/0031 |
|           |    |   |         |       | 362/626     |

(Continued)

FOREIGN PATENT DOCUMENTS

| CN | 1576907 A   | 2/2005 |
|----|-------------|--------|
| CN | 101956950 A | 1/2011 |

(Continued)

*Primary Examiner* — Tsion Tumebo
(74) *Attorney, Agent, or Firm* — CKC & Partners Co., LLC

(57) ABSTRACT

An optical component includes a phase diffraction grating and an amplitude diffraction grating. The phase diffraction grating includes a center concave section and a plurality of ring stages. The ring stages surround the center concave section. The center concave section and the ring stages form a cavity, where a light source is disposed in the cavity and emits the light to the optical component. Each of the ring stages has a stage surface. Each of the stage surfaces includes a plurality of ring microstructures arranged in concentric circles. The widths of each ring microstructure in at least one of the ring stages are less than the quarter wavelength of the light. The amplitude diffraction grating includes a center convex section and a plurality of ring parts. The center convex section and the center concave section are aligned. The ring parts surround the central convex section.

15 Claims, 9 Drawing Sheets

(56) References Cited

U.S. PATENT DOCUMENTS

| | | | | |
|---|---|---|---|---|
| 7,453,636 B2* | 11/2008 | Yeo | ...................... | G03B 21/625 |
| | | | | 359/453 |
| 8,098,562 B2* | 1/2012 | Kimura | .............. | G11B 7/13922 |
| | | | | 369/44.37 |
| 9,829,689 B2* | 11/2017 | Hukkanen | ................ | G02B 3/08 |
| 10,203,432 B2* | 2/2019 | Hu | .......................... | G02B 3/08 |
| 11,231,644 B2* | 1/2022 | Xiao | ...................... | G03B 21/60 |
| 2005/0024746 A1* | 2/2005 | Shimura | ................. | G02B 3/08 |
| | | | | 359/742 |
| 2009/0237795 A1* | 9/2009 | Koivukunnas | .......... | B44B 5/026 |
| | | | | 359/566 |
| 2010/0253591 A1* | 10/2010 | Hwu | ..................... | G02B 27/40 |
| | | | | 345/1.3 |

FOREIGN PATENT DOCUMENTS

| | | | |
|---|---|---|---|
| CN | 102287690 | A | 12/2011 |
| CN | 103939845 | A | 7/2014 |
| CN | 102809825 | B | 12/2014 |
| CN | 206248865 | U | 6/2017 |
| CN | 107238979 | A | 10/2017 |
| CN | 105607266 | B | 11/2017 |
| CN | 107608134 | A | 1/2018 |
| CN | 108369301 | A | 8/2018 |
| CN | 109036927 | A | 12/2018 |
| CN | 111061070 | A | 4/2020 |
| CN | 111781676 | A | 10/2020 |
| JP | 2010256476 | A | 11/2010 |
| JP | 2017187649 | A | 10/2017 |
| TW | 201445265 | A | 12/2014 |

\* cited by examiner

OPTICAL COMPONENT, LIGHT SOURCE MODULE AND DISPLAY DEVICE

RELATED APPLICATIONS

This application is a continuation of International application No. PCT/CN2021/136626, filed Dec. 9, 2021, the content of which are incorporated herein by reference in their entireties.

BACKGROUND

Technical Field

The present disclosure relates to an optical component, a light source module and a display device. More particular, the present disclosure relates to the optical component which emits the light uniformly, and also relates to the light source module and the display device including this optical component.

Description of Related Art

In present, light emitting diodes (LEDs) are used as the light sources of display devices. Those display devices are usually equipped with at least one component for light uniformity, for example, with a diffuser to uniform the light, and thus the light from the LEDs may be emitted uniformly. As a result, numbers of producers dedicate their effort to researching and improving the component for light-uniformity with distinctive optical principles in order to achieve the uniformity of emitting light, and further to improve the image quality of the display devices.

SUMMARY

Accordingly, an object for the disclosure is to provide an optical component, and its light incident surface and the light exiting surface can use the effect of near-field diffraction and thus, achieve the uniformity of emitting light.

At least one embodiment of the disclosure provides an optical component. The optical component uniforms the light through the effect of near-field diffraction.

At least one embodiment of the disclosure provides a light source module including the optical component.

At least one embodiment of the disclosure provides a light source module including the light source module.

At least one embodiment of the disclosure provides an optical component. The optical component has a light incident surface and a light exiting surface opposite to the light incident surface. At least one light source is suitable for emitting light toward the light incident surface. The optical component includes at least one phase diffraction grating and at least one amplitude diffraction grating. The phase diffraction grating includes a center concave section and a plurality of ring stages surrounding the center concave section and arranged in concentric circles. The center concave section and the plurality of ring stages are formed to be the light incident surface defining a cavity and becoming an inner surface of the cavity. Each of the ring stages has a first stage surface, and each of the first stage surfaces includes a plurality of ring microstructures arranged in concentric circles. A width of each of the ring microstructures on at least one of the ring stages is less than or equal to a quarter wavelength of the light. The amplitude diffraction grating includes a center convex section aligned to the center concave section, and includes a plurality of ring parts surrounding the center convex section and arranged in concentric circles. The center convex section and the ring parts are formed to be the light exiting surface.

At least in one embodiment of the disclosure, the amplitude diffraction grating perpendicularly projects a projective region on the light incident surface, and the phase diffraction grating entirely overlaps the projective region.

At least in one embodiment of the disclosure, the width of each of the ring parts is less than or equal to the wavelength of the light.

At least in one embodiment of the disclosure, the light source has a top surface, the ring stages above the top surface of the light source belong to a first group. A plurality of first angles are each formed between the top surface of the light source and the first stage surface of each of the ring stages in the first group. These first angles of the first group increasingly decrease in a direction away from the center concave section.

At least in one embodiment of the disclosure, the ring stages below the top surface of the light source belong to a second group. A plurality of second angles are each formed between the top surface of the light source and the first stage surface of each of the ring stages in the second group. These second angles of the second group increasingly increase in a direction away from the center concave section.

At least in one embodiment of the disclosure, the center convex section and the ring parts form a depression.

At least in one embodiment of the disclosure, the optical component further has a surface. The light incident surface is concavely disposed on the surface, and the light exiting surface is opposite to the surface. Each of the ring parts has a second stage surface, and each of a plurality of vertical distances between the second stage surface of each of the ring parts and the surface decrease in a direction away from the center convex section.

At least in one embodiment of the disclosure, the widths of theses ring stages are equal to each other.

At least in one embodiment of the disclosure, the widths of theses ring microstructures in the same first stage surface are equal to each other.

At least in one embodiment of the disclosure, the widths of these ring parts are equal to each other.

At least in one embodiment of the disclosure, the vertical distance between the bottom surface of the center concave section and the top surface of the light source is less than 4 mm.

At least in one embodiment of the disclosure, the optical component further includes a light incident layer, a light exiting layer and a center layer. The light incident layer has a light incident surface, and the at least one phase diffraction grating is concavely disposed on the light incident surface. The light exiting layer has a light exiting surface, and the at least one amplitude diffraction grating is formed in the light exiting surface. The center layer is disposed between the light incident layer and the light exiting layer.

At least in one embodiment of the disclosure, the refractive index of the center layer is less than the refractive index of the light incident layer or the refractive index of the light exiting layer.

Another embodiment of the disclosure provides a light source module including the optical component and light-emitting assembly. The light-emitting assembly includes at least one light source which is disposed in the cavity defined by the light incident surface.

At least in one embodiment of the disclosure, the light source is a monochromatic light source.

At least in one embodiment of the disclosure, the wavelength of the light from the light source is between 400 nm and 500 nm, and the widths of each of the ring microstructures are between 100 nm and 125 nm.

At least in one embodiment of the disclosure, the light source has an optical axis. The center convex section and the center concave section aligned to each other are coaxial. A center axis of the center concave section overlaps the optical axis.

Another embodiment of the disclosure provides a display device including a light source module and a display panel which is disposed opposite to the light source module.

According to the aforementioned description, the width of each ring microstructures on at least one ring stage is less than or equal to a quarter of wavelength of the light from the light source, hence, the phase diffraction grating is able to generate the near-field diffraction of the light to disperse the light. The amplitude diffraction grating is able to collimate the dispersed light in order to emit the light uniformly, and make the light source module appropriate to be applied on display devices, so that the image quality is improved.

BRIEF DESCRIPTION OF THE DRAWINGS

To illustrate more clearly the aforementioned and the other objects, features, merits, and embodiments of the present disclosure, the description of the accompanying figures are as follows.

DETAILED DESCRIPTION

Figure 1A:
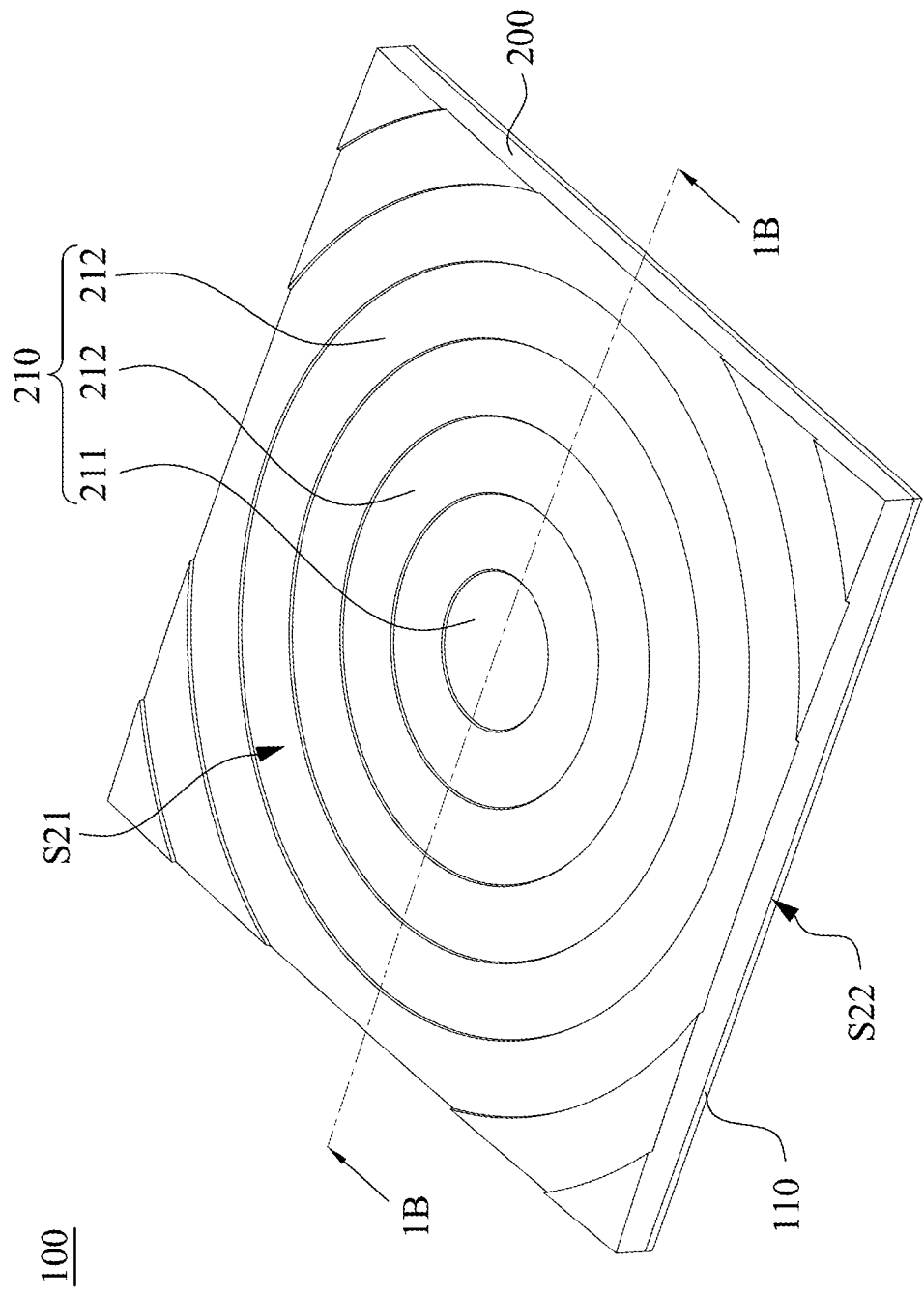
FIG. 1A illustrates a stereographic view of a light source module in accordance with at least one embodiment of the present disclosure.

In the following description, the dimensions (such as lengths, widths and thicknesses) of components (such as layers, films, substrates and regions) in the drawings are enlarged not-to-scale, and the number of components may be reduced in order to clarify the technical features of the disclosure. Therefore, the following illustrations and explanations are not limited to the number of components, the number of components, the dimensions and the shapes of components, and the deviation of size and shape caused by the practical procedures or tolerances are included. For example, a flat surface shown in drawings may have rough and/or non-linear features, while angles shown in drawings may be circular. As a result, the drawings of components shown in the disclosure are mainly for illustration and not intended to accurately depict the real shapes of the components, nor are intended to limit the scope of the claimed content of the disclosure.

Further, when a number or a range of numbers is described with "about," "approximate," "substantially," and the like, the term is intended to encompass numbers that are within a reasonable range considering variations that inherently arise during manufacturing as understood by one of ordinary skill in the art. In addition, the number or range of numbers encompasses a reasonable range including the number described, such as within +/−30%, +/−20%, +/−10% or +/−5% of the number described, based on known manufacturing tolerances associated with manufacturing a feature having a characteristic associated with the number. The words of deviations such as "about," "approximate," "substantially," and the like are chosen in accordance with the optical properties, etching properties, mechanical properties or other properties. The words of deviations used in the optical properties, etching properties, mechanical properties or other properties are not chosen with a single standard.

The disclosure provides an optical component which has a light incident surface and a light exiting surface opposite to the light incident surface, and is able to be applied to at least a light source. The aforementioned light source is appropriate for emitting the light toward the light incident surface. The optical component includes at least a phase diffraction grating and at least an amplitude diffraction grating, in which the light source uses Raman-Nath diffraction (e.g. the near-field diffraction) for producing the constructive interference. The phase diffraction grating is primary used for generating optical path differences and enhancing diffraction efficiency while the amplitude diffraction grating is used for generating the superposition wave effect of wave optics. The phase diffraction grating includes a center concave section and a plurality of ring stages. The ring stages surround the center concave section and are arranged in concentric circles. The center concave section and the ring stages form the light incident surface. The light incident surface defines a cavity. In other words, the inner surface of this cavity is composed by the center concave section and the ring stages, and each of the ring stages has a first stage surface. Each of the first stage surfaces includes a plurality of ring microstructures arranged in concentric circles. The amplitude diffraction grating includes a center convex section and a plurality of ring parts, and the center convex section is aligned to the center concave section. The ring parts surround the center convex section and are arranged in concentric circles. The center convex section and the ring parts form the light exiting surface. Furthermore, when the width of the phase diffraction grating is equivalent to the wavelength of the light source, the effect of the wave optics becomes more significant.

The optical components of the disclosure is able to receive the light emitted from the light source with the light incident surface formed by the phase diffraction grating, and the phase diffraction grating is able to disperse this light in order to make the partial light enters the optical component through the light incident surface at a larger light emergent angle. The light transmitted in the optical component propagates toward the light exiting surface formed by the amplitude diffraction grating, and then exits from the light exiting surface. The amplitude diffraction grating is able to collimate the light which is dispersed by the phase diffraction grating in order to achieve the uniformity of emitting light.

In addition, the width of each of the ring microstructures on at least one of the ring stages in the phase diffraction grating is less than or equal to a quarter wavelength of the light from the light source. Hence, a phase shift can be generated, and the phase diffraction grating is able to generate the near-field diffraction of the light to disperse this light. The amplitude diffraction grating is able to collimate the aforementioned scattered light in order to make the light emitted uniformly, and to make the light source module appropriate to be applied on display devices, so that the image quality is improved.

The following embodiments are provided with the explanatory figures for a better understanding of the features and advantages of this disclosure. The illustration is as follows.

FIG. 1A illustrates a stereoscopic view of a light module in accordance with an embodiment of the present disclosure. Referring to FIG. 1A, the light source module 100 includes the light-emitting assembly 110 and the optical component 200. The optical component 200 is disposed opposite to the light-emitting assembly 110, and the optical component 200 and the light-emitting assembly 110 are stacked on each other. The optical component 200 has the surface S22 adjacent to the light-emitting assembly 110. A portion of the surface S22 may be a plane.

The optical component 200 includes the amplitude diffraction grating 210 which is opposite to the surface S22. In other words, the amplitude diffraction grating 210 and the surface S22 are located on the opposite sides of the optical component 200 respectively. The amplitude diffraction grating 210 includes the center convex section 211 and the plurality of ring parts 212. The ring parts 212 surround the center convex section 211 and are arranged in concentric circles as shown in FIG. 1A.

The light-emitting assembly 110 emits the light toward the optical component 200. Because the whole optical component 200 is transparent, the light emitted from light-emitting assembly 110 passes through the optical component 200 and then exits from the center convex section 211 and the ring parts 212. Therefore, the center convex section 211 and the ring parts 212 is able to form the light exiting surface S21 of the optical component 200, and the light exiting surface S21 is opposite to the surface S22.

Figure 1B:
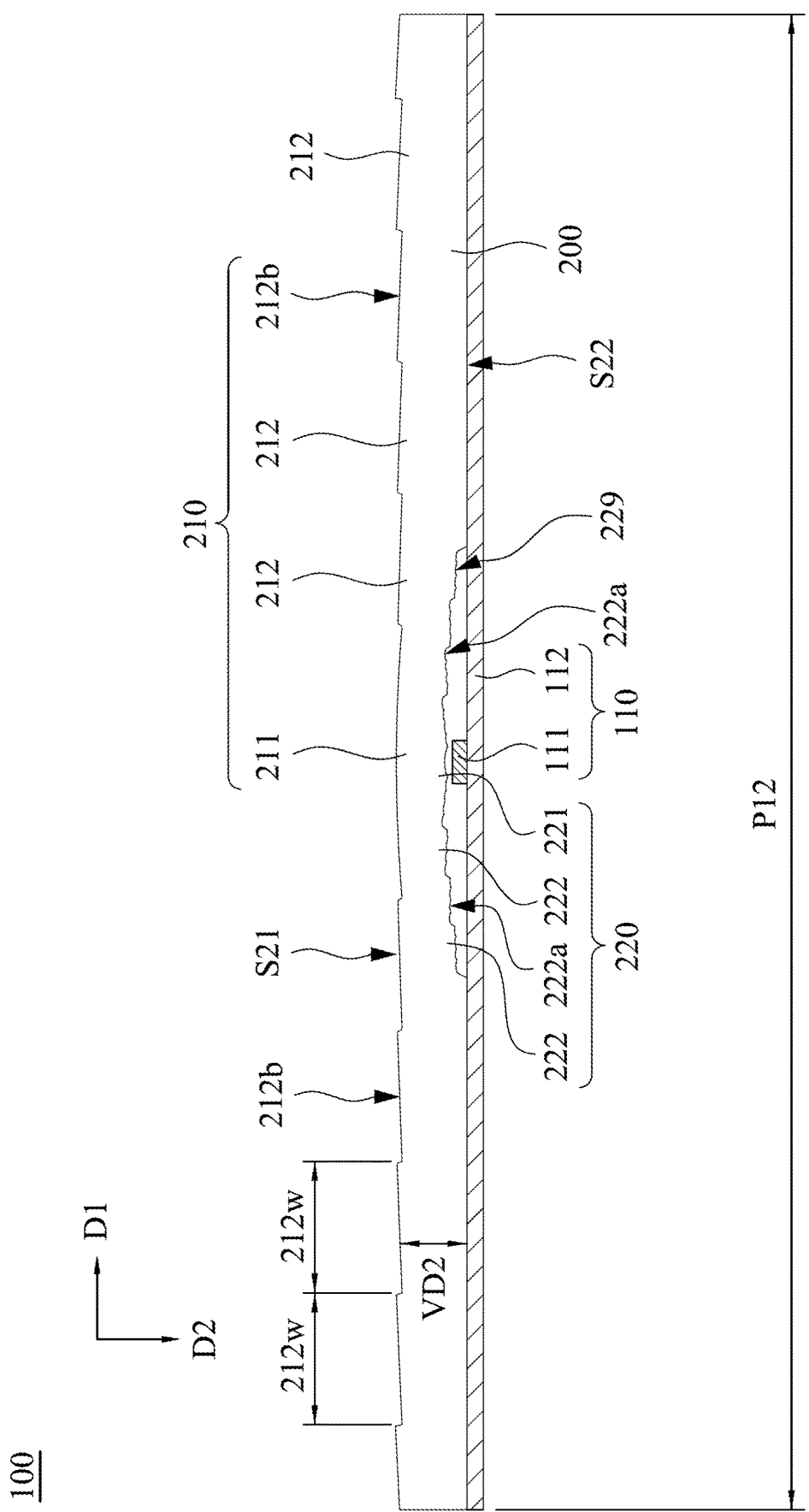
FIG. 1B illustrates cross-sectional view taken along a line 1B-1B of FIG. 1A.

FIG. 1B illustrates a cross-sectional view taken along a line 1B-1B of FIG. 1A. Referring to FIG. 1A and FIG. 1B, the widths 212w of the ring parts 212 may substantially equal to each other while the width 212w of each of the ring parts 212 is equal to a half of the difference between the outer ring diameter and the inner ring diameter. In other words, the width 212w is basically equal to the distance between the inner edge (not shown) of the ring parts 212 and the outer edge (not shown) of the ring parts 212. The width 212w may be a horizontal width, that is, the width 212w may be the width of the projection of the ring parts 212 projected onto a horizontal direction D1 (namely the half difference between the outer ring diameter and the inner ring diameter). Furthermore, in the embodiment of FIG. 1B, the surface S22 may be parallel to the horizontal direction D1, and thus the width 212w may be the width of the projection of ring parts 212 projected onto the surface S22.

It is noted that the widths 212w of the ring parts 212 may be slightly different with each other due to the influence of the processing limitations. Hence, the widths 212w may be unequal to each other within an allowable tolerance. Additionally, the center convex section 211 and the ring parts 212 may form a depression in the amplitude diffraction grating 210. The light exiting surface S21 on the amplitude diffraction grating 210 may define this depression. In other words, the inner surface of the depression includes the side wall and the bottom surface. That is, the light exiting surface S21 may be a concave surface.

The optical component 200 has not only the light exiting surface S21 but a light incident surface 229 opposite to the light exiting surface S21. The light incident surface 229 is concavely disposed on the surface S22, and thus the light incident surface 229 may be a concave surface. As a result, the light incident surface 229 may define a cavity and be the inner surface thereof. The inner surface includes the side wall and the bottom surface. In addition, a portion of the surface S22 except the light incident surface 229 may be a plane because the light incident surface 229 is concavely disposed on the surface S22.

The light-emitting assembly 110 may include at least one light source light source 111 and a circuit substrate 112, and the circuit substrate 112 may be a printed circuit board or an active device array substrate with control circuit. The light source 111 which may be a LED, such as a micro LED or a mini LED may emit the light toward the light incident surface 229. The light source 111 is mounted on the circuit substrate 112 and disposed in the cavity defined by the light incident surface 229. The light source 111 may be mounted on the circuit substrate 112 by the method of flip chip or wire bonding. The surface S22 of the optical component 200, especially the plane part, is advantageous for the attachment and the fixation on the circuit substrate 112.

The optical component 200 further includes the phase diffraction grating 220, while the phase diffraction grating 220 includes the center concave section 221 and the plurality of ring stages 222. The phase diffraction grating 220 is opposite to the amplitude diffraction grating 210, and thus the phase diffraction grating 220 and the amplitude diffraction grating 210 are formed on the two opposite sides of the optical component 200 respectively. The amplitude diffraction grating 210 may perpendicularly project a projective region P12 on the light incident surface 229 and the surface S22.

In particular, the projective region P12 is formed by projecting the amplitude diffraction grating 210 on the light incident surface 229 and the surface S22 along with a vertical direction D2. The vertical direction D2 is perpendicular to the horizontal direction D1. Referring to FIG. 1B, the phase diffraction grating 220 entirely overlaps the projective region P12, and thus the amplitude diffraction grating 210 is overlapping on the phase diffraction grating 220 and exceeds all the edges of the phase diffraction grating 220. The area of the amplitude diffraction grating 210 is obviously larger than the area of the phase diffraction grating 220.

Each of the ring stages 222 has a first stage surface 222a while each of the ring parts 212 has a second stage surface 212b, and the second stage surface 212b is an incline. In one amplitude diffraction grating 210, there is a plurality of the vertical distances VD2 between each of the second stage surface 212b and surface S22. Each of the plurality of vertical distances vertical distances VD2 decrease in the direction which is away from the center convex section 211. The vertical distance VD2 is parallel to the vertical direction D2 as shown in FIG. 1B, and the vertical distance VD2 may be equal to the thickness of the optical component 200.

Each of the second stage surface 212b has an inner edge (not shown) and an outer edge (not shown) surrounding the inner edge. The inner edge is closer to the center convex section 211 than the outer edge. Since each of the plurality of vertical distances VD2 decrease in the direction which is away from the center convex section 211, the inner edge relative to the surface S22 is higher than the outer edge relative to the surface S22 in one second stage surface 212b as shown in FIG. 1B.

Figure 1C:
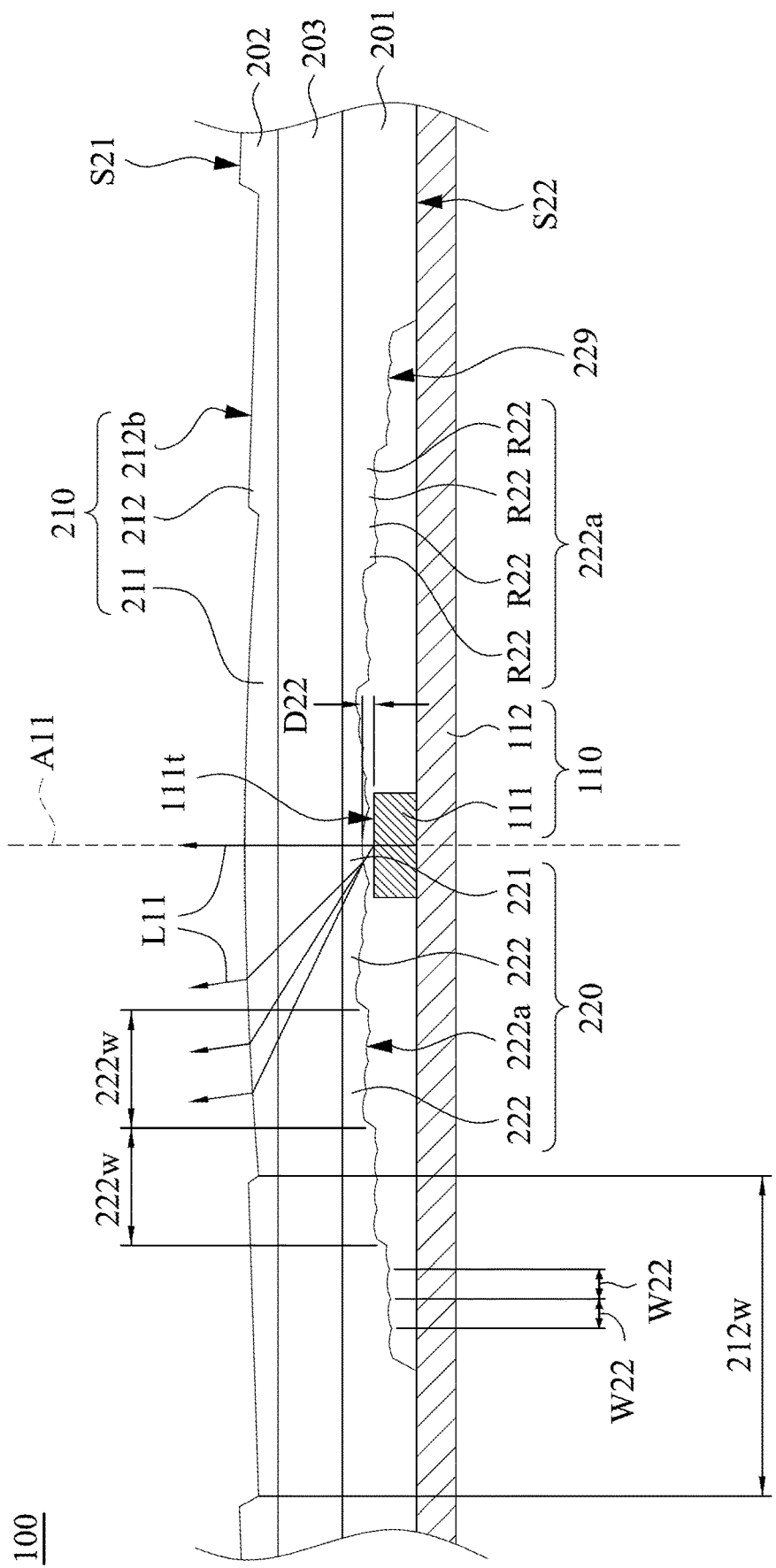
FIG. 1C illustrates a locally enlarged view of a light source module of FIG. 1B.
Figure 1D:
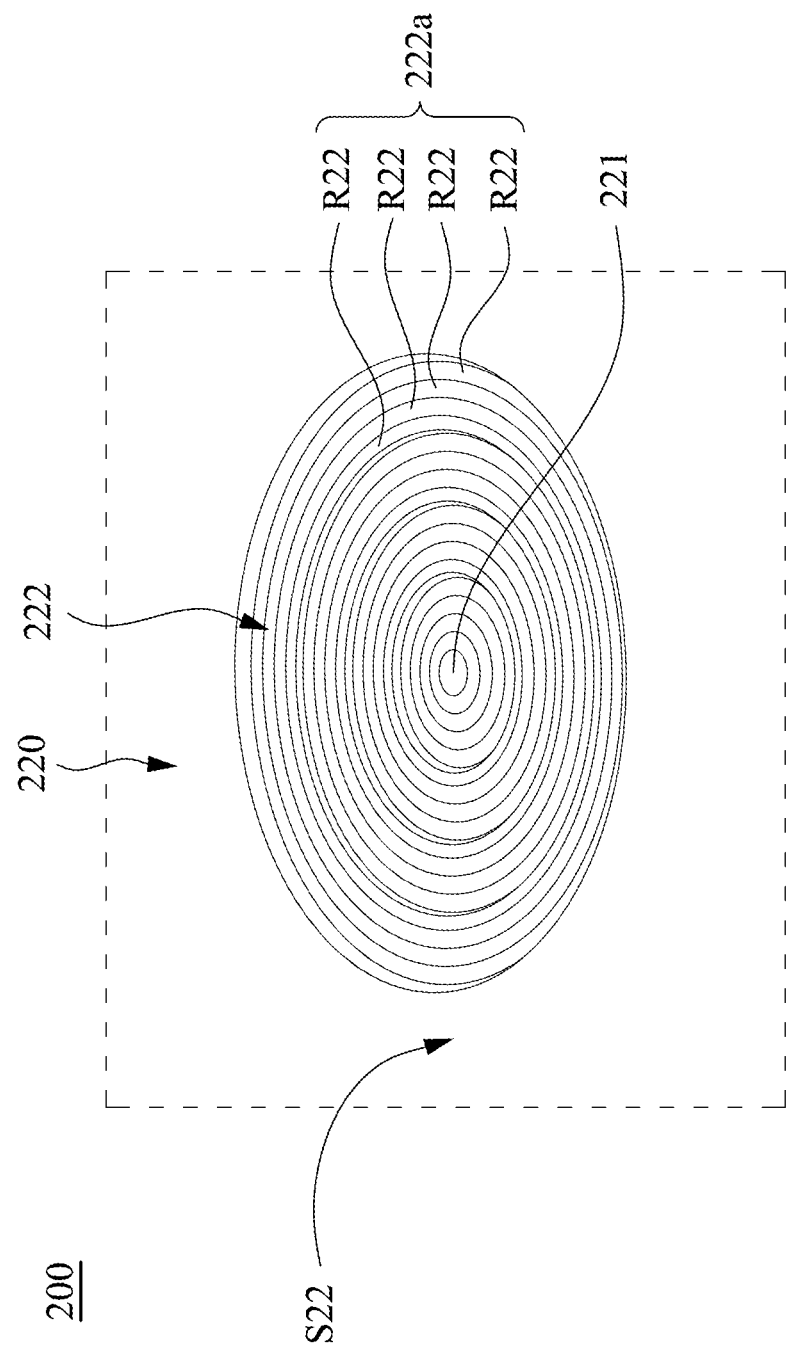
FIG. 1D illustrates a stereographic view of an optical component of FIG. 1A on its light incident surface.

FIG. 1C illustrates a locally enlarged view of the light source module shown in FIG. 1B, and FIG. 1D illustrates a locally stereoscopic view of the optical component on the light incident surface shown in FIG. 1A. Referring to FIG. 1C and FIG. 1D, the center concave section 221 and the ring stages 222 form the light incident surface 229. The ring stages 222 surround the center concave section 221 and are arranged in concentric circles. Each first stage surface 222a includes the plurality of ring microstructures R22 arranged in concentric circles, so that each of the ring microstructures R22 also surrounds the center concave section 221.

In the embodiment of FIG. 1C and FIG. 1D, the phase diffraction grating 220 may include four ring stages 222, and thus the phase diffraction grating 220 may include even number of the ring stages 222. In other embodiment, the number of the ring stages 222 which the phase diffraction grating 220 may include is 8 or 16. Therefore, the number of the ring stages 222 is not limited by FIG. 1C and FIG. 1D. In addition, each of the first stage surfaces 222a may include four ring microstructures R22 as shown in FIG. 1C and FIG. 1D.

Furthermore, referring to FIG. 1C, these distances between the different ring stages 222 and the circuit substrate 112 are not constant. Take FIG. 1C for example, these distances between the ring stages 222 and the circuit substrate 112 increasingly or gradually decrease in the direction which is away from the center concave section 221. Accordingly, the ring stages 222 with larger diameter is closer to the circuit substrate 112 while the ring stages 222 with smaller diameter is farther away from the circuit substrate 112.

The center convex section 211 is aligned to the center concave section 221, while the aligned center convex section 211 and the center concave section 221 are coaxial, that is, the center axes of center convex section 211 and the center concave section 221 are overlapping. In addition, the light source 111 has the optical axis A11, while center axes of the center concave section 221 and the center convex section 211 are overlapping with the optical axis A11. Therefore, the optical axis A11 of FIG. 1C may be deemed as the center axes of the center concave section 221 and the center convex section 211.

The widths of the ring stages 222 may be equal to each other substantially, while the widths W22 of the ring microstructures R22 in one first stage surface 222a may be equal to each other substantially. In the embodiment, the widths W22 of each ring microstructure R22 in each of the ring stages 222 are the same. However, the widths 222w are slightly different with each other, and the widths W22 of one first stage surface 222a are slightly different with each other due to the influence of the processing limitations. The widths 222w may be unequal to each other, while the widths W22 may be unequal to each other within an allowable tolerance.

The light source 111 is able to emit the light L11 toward the light incident surface 229. The light source 111 may be a monochromatic light source, so that the light L11 may be a monochromatic light with a narrow spectral linewidth. In the embodiment, the wavelength of the light L11 emitted from the light source 111 may be between 400 nm and 500 nm. For instance, the light L11 may be 400 nm or 500 nm. As a result, the color of the light L11 may be blue-green (the wavelength is about 500 nm), blue or purple (the wavelength is about 400 nm). Alternatively, the light L11 may be an invisible light, such as a UV light (the wavelength is about 380 nm). The color of the light L11 is not limited by this embodiment, that is, the light L11 may be other visible light.

The width W22 of each ring microstructure R22 on at least one of the ring stage 222 is less than or equal to a quarter wavelength of the light L11. To take FIG. 1C for example, the width W22 of each ring microstructure R22 in each of the ring stages 222 is less than or equal to a quarter wavelength of the light L11. While the wavelength of the light L11 is between 400 nm and 500 nm, the widths W22 of each ring microstructure R22 may be between 100 nm and 125 nm. For instance, the widths W22 may be 100 nm, 125 nm or 110 nm.

The width 212w of each ring part 212 may be less than or equal to the wavelength of the light L11. The light source 111 has the top surface 111t, and the depth D22 which may be the vertical distance between the bottom of the center concave section 221 and the top surface 111t may be less than 4 mm as shown in FIG. 1C. The cavity design defined by the light incident surface 229 is helpful for reducing the thickness of the light source module 100 and the optical component 200, so that the light source module 100 is on trend of thinning development of present mobile devices (e.g. smartphones and tablets). Additionally, the light L11 of the light source 111 is able to be emitted from the top surface 111t. Hence, the top surface 111t may be as the light exiting surface of the light source 111. In another embodiment, the light source 111 is able to be emitted from the side surface and the top surface 111t in order to increase the light emergent angle of the light source 111.

The optical component 200 may further include a light incident layer 201, a light exiting layer 202 and a center layer 203. The center layer 203 is disposed between the light incident layer 201 and the light exiting layer 202. The light incident layer 201 has the light incident surface 229, so that the phase diffraction grating 220 is concavely disposed on and formed in the light incident layer 201. The light exiting layer 202 has the light exiting surface S21, so that the amplitude diffraction grating 210 is also concavely disposed on and formed in the light exiting layer 202. The light incident layer 201 and the light exiting layer 202 may be formed of the same materials. For example, the light incident layer 201 and the light exiting layer 202 may be made of the UV curing adhesives, and the refractive indexes of the light incident layer 201 and the light exiting layer 202 are about 1.61. In addition, the phase diffraction grating 220 and the amplitude diffraction grating 210 may be formed by imprinting or roll-to-roll processing, which imprints the featured patterns on the circumference of the roller over the surfaces of the light incident layer 201 and the light exiting layer 202.

The center layer 203 may be made of polymer material, which is, for example, polycarbonate (PC), poly methyl methacrylate (PMMA), or methyl methacrylate styrene copolymer (MS). The refractive index of PC is about 1.57 while the refractive index of PMMA is about 1.49 and the refractive index of MS is about 1.59.

Accordingly, the refractive index of the center layer 203 may be between 1.4 and 1.6, such as 1.49, 1.57 or 1.59. Therefore, the refractive index of the center layer 203 may be less than the refractive index of the light incident layer 201 or the light exiting layer 202 (for example, the refractive indexes of the light incident layer 201 and the light exiting layer 202 are about 1.61), so that the light L11 through the interface between the center layer 203 and the light incident layer 201 may be matched with the light incident angle for the near-field diffraction, and thus the amplitude diffraction grating 210 is able to collimate the light dispersed by the phase diffraction grating 220 in order to achieve the light-uniformity.

Figure 1E:
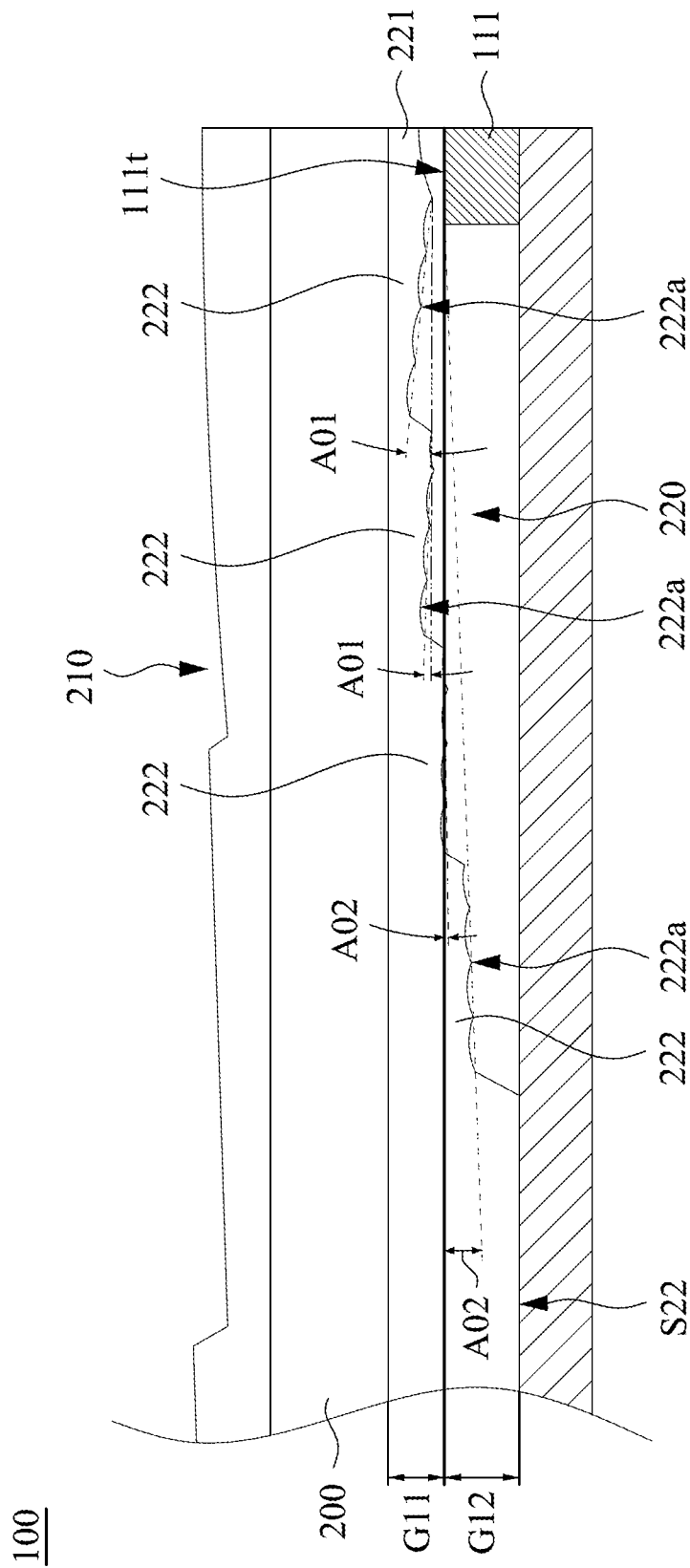
FIG. 1E illustrates a locally enlarged view of a light source module of FIG. 1C.

FIG. 1E illustrates the locally enlarged view of the light module of FIG. 1C, and FIG. 1E only depicts the left part of the light source module 100 of FIG. 1C. Referring to FIG. 1E, the ring stages 222 are distributed above and beneath the top surface 111t. The ring stages 222 above the top surface 111t belong to the first group G11 while the ring stages 222 beneath the top surface 111t belong to the second group G12. To take FIG. 1E for instance, there are four ring stages 222, in which two of the ring stages 222 are above the top surface 111t and two of the ring stages 222 are beneath the ring stages 222, that is, the first group G11 has two ring stages 222 and the second group G12 has two ring stages 222.

In the embodiment, the ring stages 222 are classified according to the positions of the first stage surfaces 222a relative to the top surface 111t. Specifically, the ring stages 222 with the first stage surface 222a higher than the top surface 111t belong to the first group G11, and the ring stages 222 with the first stage surface 222a lower than the top surface 111t belong to the second group G12.

First angles A01 are formed between the top surface 111t of the light source 111 and each of the first stage surfaces 222a of the first group G11, while second angles A02 are between the top surface 111t of the light source 111 and each of the first stage surfaces 222a of the second group G12. As shown in FIG. 1E, the first angles A01 increasingly or gradually decrease in the direction away from the center concave section 221. Accordingly, the first angle A01 which is the closest to the center concave section 221 is the largest, while the first angle A01 which is the farthest from the center concave section 221 is the smallest. The second angles A02 increasingly or gradually increase in the direction which is away from the center concave section 221. Accordingly, the second angle A02 which is the closest to the center concave section 221 is the smallest, while the second angle A02 which is the farthest from the center concave section 221 is the largest. In other words, the feature that the angle between each first stage surface 222a of the ring stages 222 and the optical axis of the light source 111 increases with the increasing diameter of the ring stage, is able to allow the light incident surface 229 of the optical component 200 to receive the light L11 uniformly.

Referring to FIG. 1C, the phase diffraction grating 220 includes the ring stages 222, and each ring stage 222 includes the ring microstructures R22. The widths W22 of each ring microstructure R22 are less than or equal to a quarter of the wavelength of the light L11. Hence, the phase diffraction grating 220 is able to generate the near-field diffraction of the light L11, and thus the light L11 is dispersed into multiple-order light such as the 0 order, $1^{st}$ order, $2^{nd}$ order and $3^{rd}$ order diffractive light. Accordingly, the phase diffraction grating 220 may disperse the light L11, so that the light L11 is not accumulated in the optical component 200.

The ring microstructures R22 is able to increase the optical path difference so that the phase diffraction grating 220 disperses the light L11 into multiple lights (as the multiple-order light mentioned above), and thus the diffraction angle is increased to uniform the light L11. The amplitude diffraction grating 210 may collimate the multiple-order light generated by the phase diffraction grating 220, and the light L11 is able to be emitted uniformly from the light exiting surface S21, so that the light source module 100 is advantageously used as the light source of the display devices.

It is noted that each optical component 200 of FIG. 1A to FIG. 1E includes one amplitude diffraction grating 210 and one phase diffraction grating 220, respectively, while each light-emitting assembly 110 includes one light source 111. However, in other embodiments, the optical component may include a plurality of amplitude diffraction gratings and a plurality of phase diffraction gratings while the light-emitting assembly may include a plurality of light sources, for example, as a light source module 500 shown in FIG. 2A.

Figure 2A:
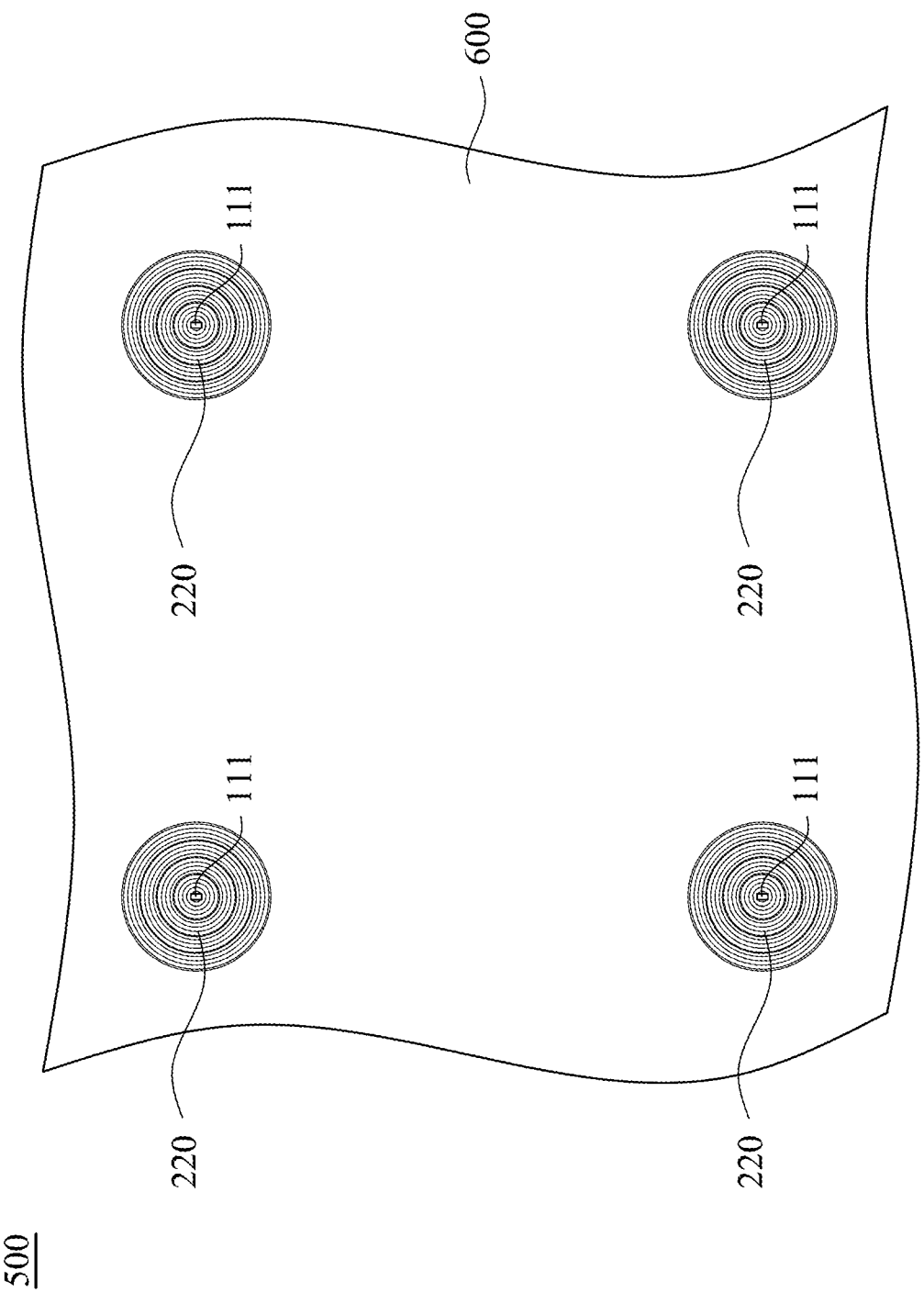
FIG. 2A illustrates bottom view of a light source module in accordance with at least one embodiment of the present disclosure.
Figure 2B:
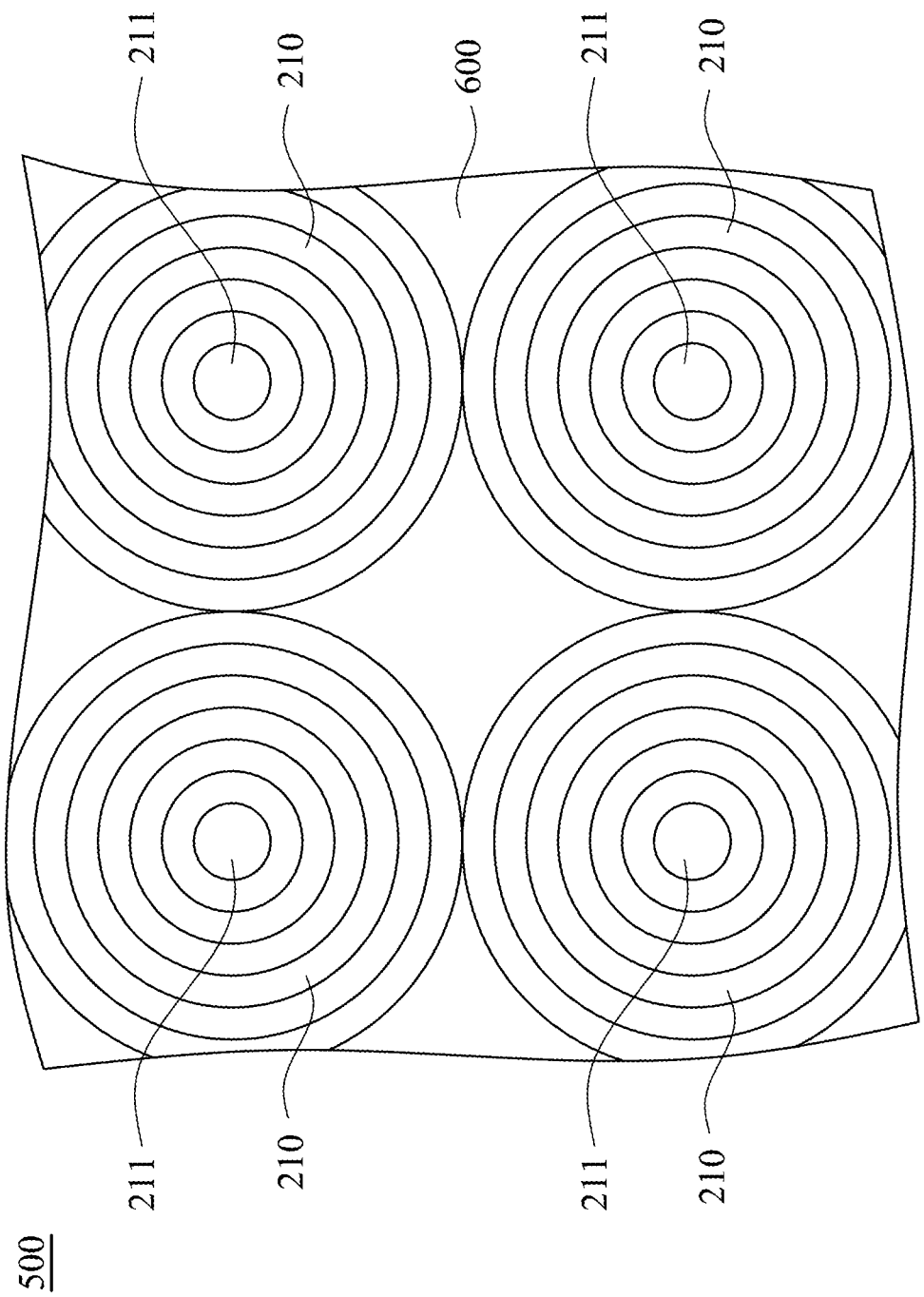
FIG. 2B illustrates a top view of a light source module of FIG. 2A.

FIG. 2A illustrates the bottom view of a light source module in accordance with at least an embodiment of the present disclosure, and FIG. 2B illustrates the top view of the light source module of FIG. 2A. Referring to FIG. 2A and FIG. 2B, the light source module 500 includes the optical component 600 and the light-emitting assembly. The light-emitting assembly of the light source module 500 includes the plurality of the light sources 111. In addition, the light-emitting assembly in the embodiment may further include a circuit substrate (such as the circuit substrate 112 not shown in FIG. 2A and FIG. 2B), and the light sources 111 are mounted on the circuit substrate 112.

The optical component 600 may include the plurality of amplitude diffraction gratings 210 and the plurality of phase diffraction gratings 220. The phase diffraction gratings 220 may be arranged in an array (as shown in FIG. 2A) while the amplitude diffraction gratings 210 may be arranged in an array (as shown in FIG. 2B). The light sources 111 are disposed in the phase diffraction grating 220 respectively, while the number of the light sources 111 may be equal to the number of the phase diffraction gratings 220. Furthermore, the amplitude diffraction gratings 210 are adjacent to each other, and the edges of two adjacent amplitude diffraction gratings 210 may be connected with each other as shown in FIG. 2B.

The amplitude diffraction gratings 210 are aligned to the phase diffraction gratings 220 respectively. Therefore, the center axes of the center convex sections 211 of the amplitude diffraction gratings 210 are substantially overlapping to the center axes of the center convex sections 211 (not shown) of the phase diffraction gratings 220. Moreover, the numbers of the light sources 111, the phase diffraction gratings 220 and the amplitude diffraction gratings 210 may be the same.

Figure 2C:
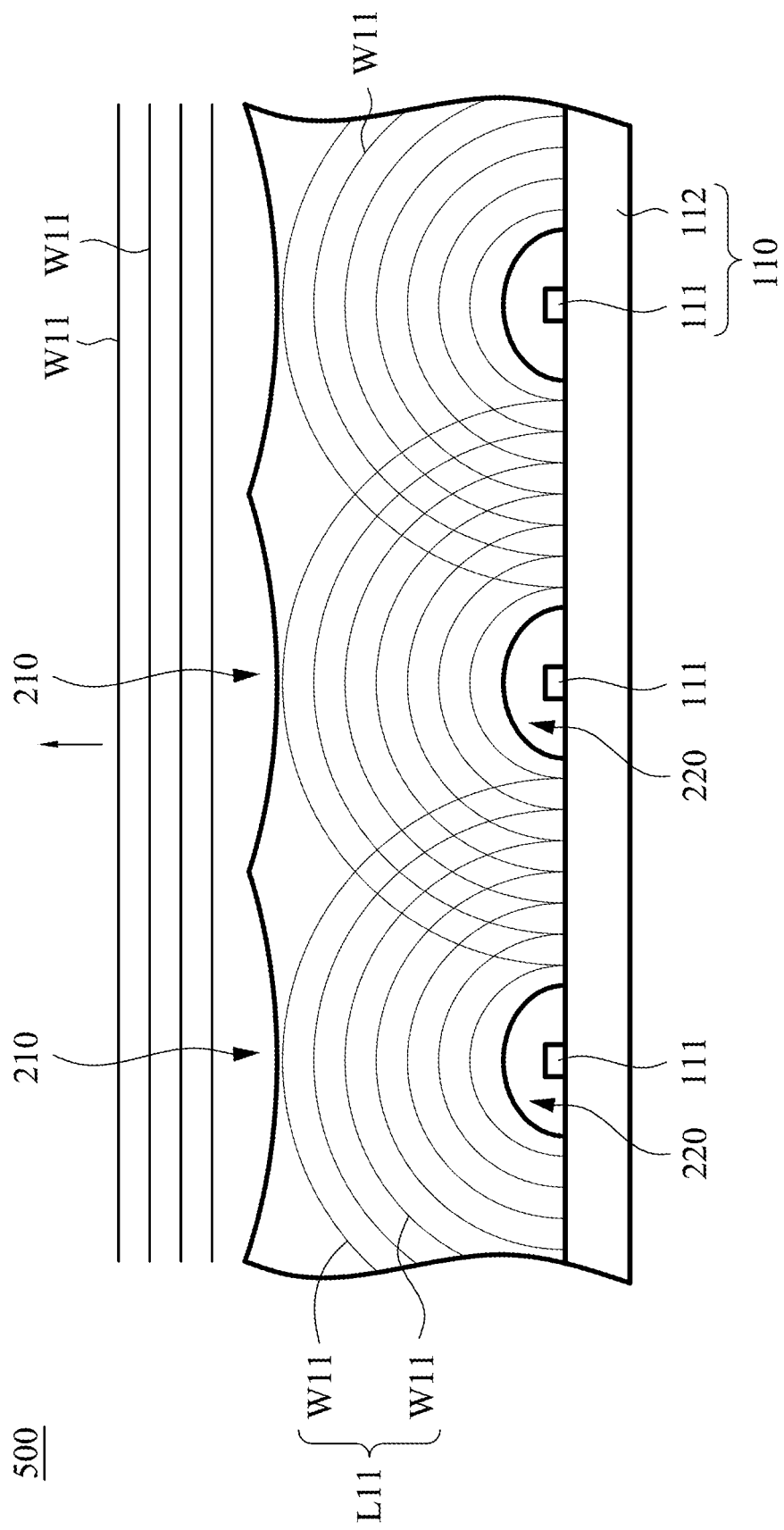
FIG. 2C illustrates a cross-sectional view of a light source module of FIG. 2A.

FIG. 2C illustrates the cross-section view of a light source module of FIG. 2A. Referring to FIG. 2C, when the light sources 111 of the light source module 500 emit the light, the light L11 emitted from the light sources 111 enters the phase diffraction gratings 220 and is diffracted by the phase diffraction gratings 220. Each light L11 has the plurality of wavefronts W11, and the phase diffraction grating 220 is able to make the wavefronts W11 of the light L11 form a non-plane wave, such as the spherical wave shown in FIG. 2C. The wavefronts W11 of the lights L11 are superposed to each other, and thus the light L11 of the light sources 111 may interfere with each other.

When the interfered light L11 enters into the amplitude diffraction gratings 210, the amplitude diffraction gratings 210 can make the wavefronts W11 of the light L11 emitted by the amplitude diffraction gratings 210 turn into a plane wave (as shown in FIG. 2C). Accordingly, the interfered light L11 may be uniformed by the amplitude diffraction gratings 210, so that the light L11 emitted from the light sources 111 may be emitted uniformly from the amplitude diffraction gratings 210.

Furthermore, the scale of the light source module 500 shown in FIG. 2C is different from the scale of the light source module 100 shown in FIG. 1B and FIG. 1C, and the components of the light source module 500 of FIG. 2C (e.g. the amplitude diffraction grating 210 and the phase diffraction grating 220) are not on the same scale, so that the interference phenomenon is clearly to be shown so as to clearly present the technical features of this disclosure.

The light source module 500 includes the plurality of light sources 111 and the optical component 600, while the optical component 600 includes the plurality of amplitude diffraction gratings 210 and the plurality of phase diffraction gratings 220, so that the light source module 500 is appropriate to be applied on display devices, especially on large scale display devices. In other words, the light source module 500 is appropriate for large scale display devices and being as the direct type backlight module of the display device.

Additionally, the circuit substrate 112 mounted with the light sources 111 may have a control circuit (not shown), which controls the light sources 111 to emit the light. For example, the control circuit is able to control the light sources 111 in at least two different regions, and thus these regions may present two different kinds of brightness in order to achieve the dimming effect and improve the contrast.

Figure 3:
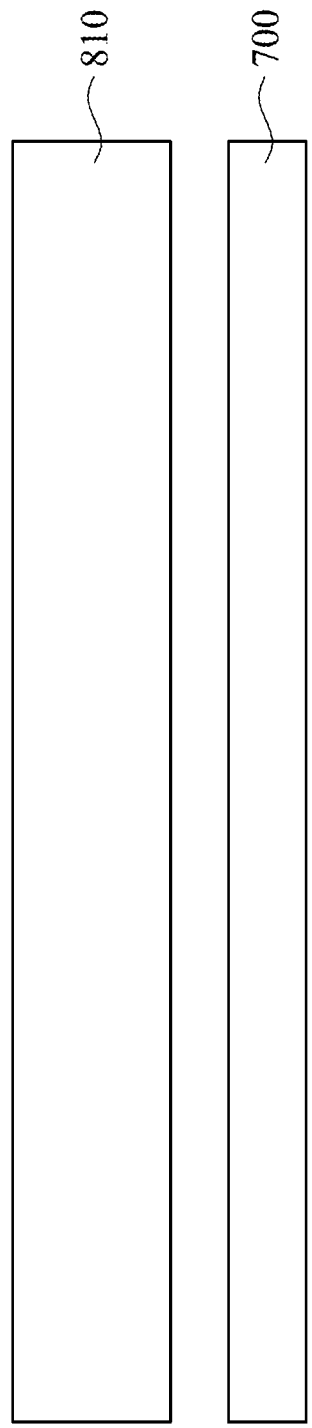
FIG. 3 illustrates a schematic diagram of a display device in accordance with at least one embodiment of the present disclosure.

FIG. 3 illustrates a schematic diagram of a display device in accordance with one embodiment of the present disclosure. Referring to FIG. 3, the display device 800 includes the light source module 700 and the display panel 810, and the display panel 810 is disposed oppositely to the light source module 700. The light source module 700 may be the light source module 100 or the light source module 500 of the aforementioned embodiments, and thus the light source module 700 may include at least one light source 111 and the circuit substrate 112 (are not shown in FIG. 3).

While the light source module 700 includes the plurality of light sources 111 and the light sources 111 are monochromatic light sources, the circuit substrate 112 may be a transistor array substrate with a plurality of thin-film transistors (TFTs), and the display panel 810 may include several kinds of wavelength converting layers (not shown). The wavelength converting layers may convert the light L11 emitted from the light source 111 into the light with different colors. For example, the light L11 may be blue light, and the wavelength converting layers is able to convert the lights L11 of the light sources 111 into red or green light, so that the display panel 810 is able to present the images consist of red, green and blue light. Moreover, the materials of the wavelength converting layers may be fluorescent materials or quantum dots materials while the display device 800 may be a quantum dots light LED (QLED) display.

It is worth mentioning that referring to FIG. 1C and FIG. 3, the optical component of the light source module 700 may include the light incident layer 201, the light exiting layer 202 and the center layer 203, as the light source module 100 shown in FIG. 1C. Therefore, the total internal reflection (TIR) occurs inside the optical component of the light source module 700 (namely the interface between the center layer 203 and the light incident layer 201) in order to reflect the light Li 1 deviated from the optical axis A11, and the light leakage of the display device 800 may thereby be reduced or avoided.

It is noted that although the aforementioned light source module 100, the light source module 500 and the light source module 700 are appropriate to be applied on the display devices, the light source modules 100, 500 and 700 are also appropriate to be applied in other technical fields. In particular, the light source modules 100, 500 and 700 may be used in lamps, such as advertising light boxes. As a result, the light source modules and their optical components in the above embodiments are not limited to be applied on the display devices.

Although the embodiments of the present disclosure have been disclosed as above in the embodiments, they are not intended to limit the embodiments of the present disclosure. Any person having ordinary skill in the art can make various changes and modifications without departing from the spirit and the scope of the embodiments of the present disclosure. Therefore, the protection scope of the embodiments of the present disclosure should be determined according to the scope of the appended claims.

What is claimed is:

1. An optical component with a light incident surface and a light exiting surface opposite to the light incident surface, and at least one light source suitable for emitting light toward the light incident surface, the optical component comprising:
    at least one phase diffraction grating, comprising:
        a center concave section; and
        a plurality of ring stages, surrounding the center concave section and arranged in concentric circles, wherein the center concave section and the plurality of ring stages are formed to be the light incident surface defining a cavity, wherein each of the ring stages has a first stage surface, and the first stage surface includes a plurality of ring microstructures arranged in concentric circles, wherein a width of each of the ring microstructures on at least one of the ring stages is less than or equal to a quarter wavelength of the light; and
    at least one amplitude diffraction grating, comprising:
        a center convex section, aligned to the center concave section; and
        a plurality of ring parts, surrounding the center convex section and arranged in concentric circles, wherein the center convex section and the ring parts are formed to be the light exiting surface.

2. The optical component of claim 1, wherein the at least one amplitude diffraction grating perpendicularly projects a projective region on the light incident surface, and the at least one phase diffraction grating entirely overlaps the projective region.

3. The optical component of claim 1, wherein a width of each of the ring parts is less than or equal to the wavelength of the light.

4. The optical component of claim 1, wherein the at least one light source has a top surface, the ring stages above the top surface of the light source belong to a first group, and a plurality of first angles are each formed between the top surface of the light source and the first stage surface of each of the ring stages in the first group,
    wherein these first angles of the first group increasingly decrease in a direction away from the center concave section.

5. The optical component of claim 4, wherein the ring stages below a top surface of the light source belong to a second group, and a plurality of second angles are each formed between the top surface of the light source and the first stage surface of each of the ring stages in the second group,
    wherein these second angles of the second group increasingly increase in a direction away from the center concave section.

6. The optical component of claim 1, wherein the center convex section and the ring parts form a depression.

7. The optical component of claim 1, further having a surface, wherein the light incident surface is concavely disposed on the surface, and the light exiting surface is opposite to the surface, each of the ring parts has a second stage surface, and each of a plurality of vertical distances between the second stage surface of each of the ring parts and the surface decrease in a direction away from the center convex section.

8. The optical component of claim 1, further comprising:
a light incident layer with the light incident surface, wherein the at least one phase diffraction grating is concavely disposed on the light incident surface;
a light exiting layer with the light exiting surface, wherein the at least one amplitude diffraction grating is formed in the light exiting surface; and
a center layer disposed between the light incident layer and the light exiting layer.

9. The optical component of claim 8, wherein a refractive index of the center layer is less than a refractive index of the light incident layer.

10. The optical component of claim 8, wherein a refractive index of the center layer is less than a refractive index of the light exiting layer.

11. A light source module, comprising:
the optical component of claim 1; and
a light-emitting assembly, including at least a light source, wherein the at least one light source is disposed in the cavity.

12. The light source module of claim 11, wherein the at least one light source is a monochromatic light source.

13. The light source module of claim 11, wherein a wavelength of a light from the at least one light source is between 400 nm and 500 nm, and a width of each of the ring microstructures is between 100 nm and 125 nm.

14. The light source module of claim 11, wherein the light source has an optical axis, and the center convex section and the center concave section aligned to each other are coaxial, wherein a center axis of the center concave section overlaps the optical axis.

15. A display device, comprising:
the light source module of claim 11; and
a display panel disposed opposite to the light source module.

* * * * *